US009629493B2

(12) United States Patent
Belanich et al.

(10) Patent No.: US 9,629,493 B2
(45) Date of Patent: Apr. 25, 2017

(54) APPARATUS FOR COLD BREWING COFFEE

(71) Applicant: Joyride Coffee Distributors, LLC, Woodside, NY (US)

(72) Inventors: Adam Belanich, Astoria, NY (US); David Belanich, Douglaston, NY (US); Noah Belanich, Astoria, NY (US); Anders Crabo, Bellingham, WA (US)

(73) Assignee: Joyride Coffee Distributors, LLC, Woodside, NY (US)

( * ) Notice: Subject to any disclaimer, the term of this patent is extended or adjusted under 35 U.S.C. 154(b) by 0 days.

(21) Appl. No.: 14/559,289

(22) Filed: Dec. 3, 2014

(65) Prior Publication Data
US 2016/0015204 A1 Jan. 21, 2016

Related U.S. Application Data

(60) Provisional application No. 62/026,331, filed on Jul. 18, 2014.

(51) Int. Cl.
*A47J 31/02* (2006.01)
*A47J 31/06* (2006.01)

(52) U.S. Cl.
CPC ..................................... *A47J 31/06* (2013.01)

(58) Field of Classification Search
CPC ........................................................ A47J 31/06
USPC ......... 99/296, 279, 323, 317, 321, 318, 319, 99/316, 417; 210/170, 256, 259, 260, 210/411, 413, 414, 452, 497.1, 497.2, 210/482, 455, 332, 338, 339
See application file for complete search history.

(56) References Cited

U.S. PATENT DOCUMENTS

| 686,689 | A | | 11/1901 | Eschwege |
| 1,345,947 | A | | 7/1920 | Muller |
| 2,599,682 | A | | 6/1952 | Wirtel et al. |
| 2,770,181 | A | | 11/1956 | Kahan |
| 2,878,746 | A | | 3/1959 | Schwinger |
| 3,854,389 | A | | 12/1974 | Hillemann |
| 4,751,875 | A | | 6/1988 | Wooten, Jr. |
| 5,085,771 | A | * | 2/1992 | Huang ................. B01D 29/071 209/205 |
| 5,637,343 | A | | 6/1997 | Ryan, Jr. |
| 7,485,218 | B2 | | 2/2009 | Dussich, I |
| 7,717,026 | B1 | | 5/2010 | Lassota |
| 8,720,321 | B2 | | 5/2014 | Neace, Jr. et al. |
| 2009/0056557 | A1 | * | 3/2009 | Lin ......................... A47J 31/02 99/323 |

(Continued)

FOREIGN PATENT DOCUMENTS

JP 2013252083 12/2013
KR 101302978 9/2013

*Primary Examiner* — Phuong Nguyen
(74) *Attorney, Agent, or Firm* — Lowenstein Sandler LLP

(57) ABSTRACT

An apparatus for cold brewing coffee includes a filter insert, a filter frame receiving the filter insert therein and a barrel receiving the filter frame and the filter insert, wherein the filter insert has a stainless steel mesh cylindrical side wall and a stainless steel mesh flat bottom perpendicular to the side wall. The filter frame has a perforated cylindrical side wall and a perforated flat bottom, wherein the perforated cylindrical side wall is arranged coaxially with the stainless steel mesh cylindrical side wall of the filter insert.

11 Claims, 7 Drawing Sheets

(56) References Cited

U.S. PATENT DOCUMENTS

2012/0234182 A9 * 9/2012 Neace, Jr. ............ A47J 31/002
                                                    99/279
2014/0178559 A1   6/2014 Neace, Jr.

* cited by examiner

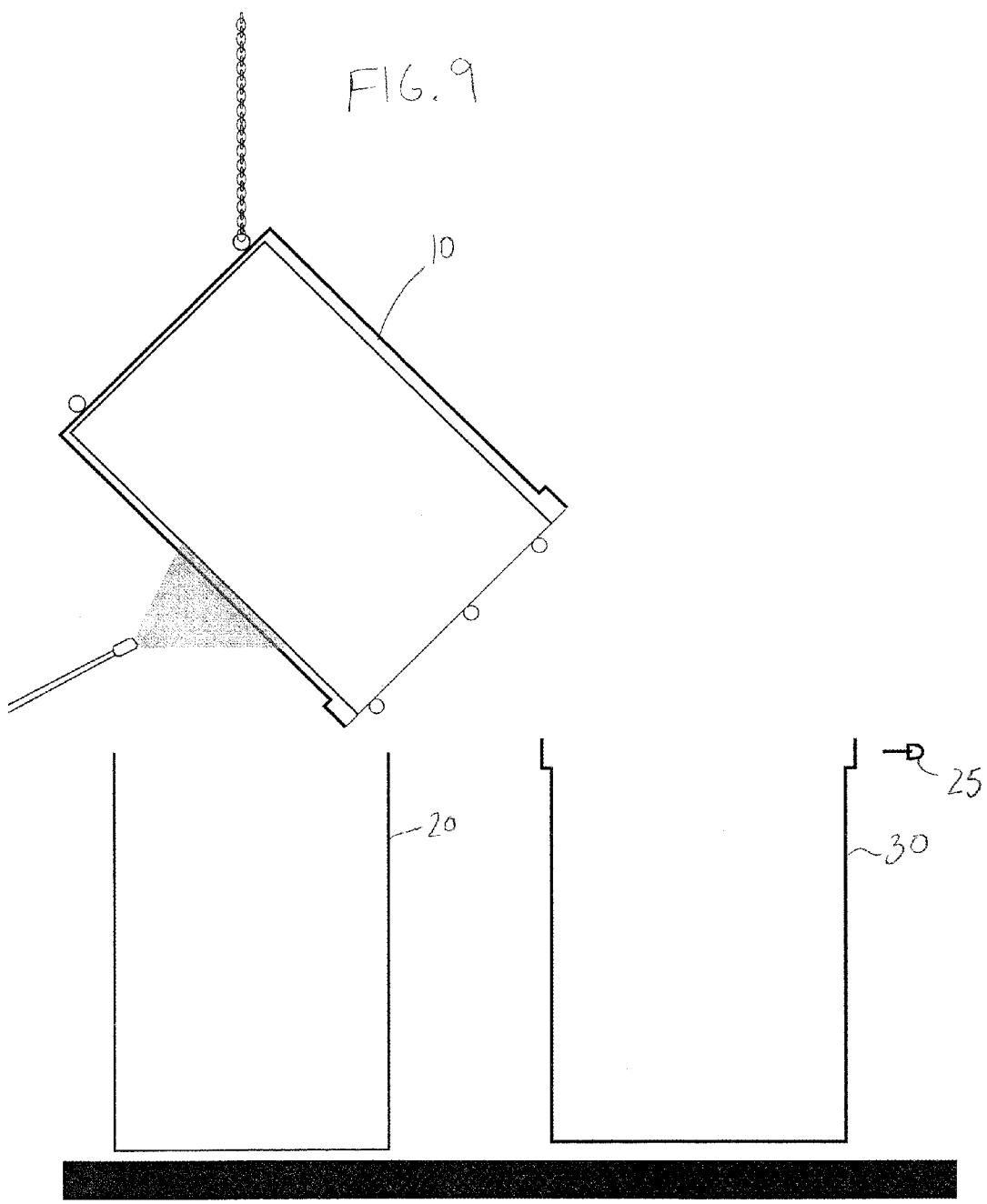

APPARATUS FOR COLD BREWING COFFEE

CROSS-REFERENCE TO RELATED APPLICATION

This application claims the benefit of U.S. Provisional Application No. 62/026,331, filed Jul. 18, 2014, which is incorporated herein by reference in its entirety for all purposes.

BACKGROUND

While cold brewing, a technique that involves steeping coffee at cold temperatures for an extended period of time, is by no means a new technique, in recent years general knowledge of and demand for cold-brewed coffee, or cold brew, has increased dramatically. Presently, there are generally four conventional methods for cold brewing coffee.

The first method involves a filtration process utilizing a cheese cloth felt filter for holding coffee grinds, while water is passed through the filter to produce a cold brewed coffee. However, this filter is limited to producing small amounts of coffee and requires an extensive amount of cleaning to remove contaminants from the cloth filter.

The second conventional method is generically referred to as a "bucket system" which involves batch brewing within individual buckets. The primary disadvantage with his system is the significant lack of consistency from batch to batch.

The third method is generally carried out in coffee shops or cafes and involves use of a commercially available dripper machine. This method is limited is designed for brewing individual cups of coffee and is not well suited for large scale production.

The fourth conventional method utilizes equipment initially designed for brewing beer, but which has been adapted for cold brewing coffee. While this method is suitable for industrial scale cold brewing of coffee, the necessary equipment is very expensive and difficult to use.

Accordingly, there is a need in the art for an apparatus and method for cold brewing coffee that overcomes the above described drawbacks. Specifically, it would be desirable to provide a method and apparatus for cold brewing coffee on a large scale that is inexpensive and easy to implement and use with high consistency of the finished brew, and that is also easy to clean.

SUMMARY OF THE INVENTION

In one aspect of the invention, an apparatus for cold brewing coffee includes a filter insert, a filter frame receiving the filter insert therein and a barrel receiving the filter frame and the filter insert, wherein the filter insert has a stainless steel mesh cylindrical side wall and a stainless steel mesh flat bottom perpendicular to the side wall. The filter frame has a perforated cylindrical side wall and a perforated flat bottom, wherein the perforated cylindrical side wall is arranged coaxially with the stainless steel mesh cylindrical side wall of the filter insert.

The filter insert further preferably includes a support frame for supporting the mesh cylindrical side wall and the mesh flat bottom, wherein the support frame includes a plurality of straps welded together in a cylindrical lattice arrangement. The plurality of straps preferably includes a top ring defining an open top and of the filter insert, and the top ring has a plurality of radially arranged attachment points for attaching the filter insert to the filter frame.

In this embodiment, the filter frame includes a base ring disposed at a top open and of the perforated cylindrical side wall, and the base ring has a plurality of attachment points sized and arranged to match the attachment points of the filter insert. The attachment points may take the form of drilled holes and the apparatus may further include quick disconnect ball-lock pins inserted into the holes for attaching the filter insert to the filter frame.

The support frame further preferably includes at least one grip bar attached between two locations along an inside periphery of the top ring to facilitate gripping of the filter insert. The filter frame further preferably includes a plurality of eyelets attached to the base ring for lifting the filter frame and at least one eyelet attached to the bottom for inverting the filter frame.

The filter frame further preferably includes two support bars attached to the bottom of the frame. In this case, the apparatus includes two support legs provided across a top open end of the barrel for engaging the support bars of said filter frame to temporarily support the filter frame above the barrel.

An inner diameter of the filter frame and an outer diameter of the filter insert preferably define a space therebetween of between ½ inch therebetween. An inner diameter of the barrel and the outer diameter of the filter frame define a space therebetween of between 2-4 inches. Also, a space of about 1 inch is defined between the bottom of the filter frame and the bottom of the barrel.

In another aspect of the invention, a method for cold brewing coffee is provided. The method generally includes depositing an amount of coffee grinds within a filter insert having a stainless steel mesh cylindrical side wall and a stainless steel mesh bottom perpendicular to said side wall. The filter insert is inserted into a filter frame having a perforated cylindrical side wall and a perforated flat bottom. The filter frame is inserted into a barrel and an amount of water is poured into the filter insert having the coffee grinds. The coffee grinds and water are allowed to brew for a period of time after which the filter frame with the filter insert and the coffee grinds are lifted out of the barrel.

In a preferred embodiment, the method further includes supporting the filter frame with the filter insert and the coffee grinds over the barrel and pouring an additional amount of water into the filter insert, wherein the additional amount of water drips through the filter insert and the filter frame into the barrel. In this embodiment, the filter frame with the filter insert and coffee grinds is temporarily supported over the barrel by at least two legs spanning across an open end of the barrel.

About 40-55 pounds of coffee grinds are deposited within the filter insert and about 40-55 gallons of water is poured into the filter insert in a preferred process. Also in this embodiment, about 5-15 pounds of coffee grinds and about 5-15 gallons of water are added in alternating steps until the total amount of 40-55 pounds of coffee grinds and 40-55 gallons of water are added. The period of time for allowing the coffee grinds and the water to brew is preferably about 16 hours at room temperature and the additional amount of water added is about five gallons and is allowed to drip for about 2-3 hours.

The method further preferably includes pumping a brewed coffee liquid out of the barrel into a keg and refrigerating the keg. Also, the brewed coffee liquid is strained before being pumped into the keg.

Thus, the present invention is generally a "top hat" brewer designed such that the coffee is evenly distributed throughout the brewer by closely matching the external diameter of the brewer to the internal diameter of the drum. In this manner, the coffee will be surrounded on all sides by a volume of water generally equivalent to the volume of coffee, and the coffee will be sandwiched by water of equivalent thickness. To achieve this goal, a novel brewing apparatus, described herein as a "top hat," utilizes a cylindrical, flat-bottomed filter of perforated and woven stainless steel that hangs from the mouth of and sits inside a standard 55-gallon drum.

BRIEF DESCRIPTION OF THE DRAWINGS

FIG. 9 shows the process for cleaning the filter assembly of the present invention.

DETAILED DESCRIPTION

The process of cold brewing is a fairly simple, time-dependent extraction and dissolution process of two ingredients: coffee grinds and water. Energetic components found in other brew processes, most notably heat and pressure, are not present in cold brewing.

An important consideration in cold brewing is Brew Ratio Units (BRU) strength, a novel and universal means of considering and discussing coffee to water ratios. The BRU is a simple ratio of the coffee mass to water mass used in a brewing process. BRU strength is a unit less measurement very similar to a mass ratio, and is calculated as kilograms of coffee grinds over kilograms of water. This BRU measurement will bridge the disconnect between small- and large-scale brewing and facilitate comparison of the two. Most consider small-scale brewing processes in terms of grams coffee and grams water used and think of large-scale production in terms of poundage and gallons. The universality of BRU means that BRU applies to all brewing processes. To measure BRU, one needs only a balance (or scale) because one liter of water weighs one kilogram and one milliliter, one gram.

By using and thinking in BRU, the present invention was developed, wherein a 55-gallon brewer was designed with a filter having dimensions that promote efficient extraction and ideal brew concentration or perceived strength. It has been surprisingly found that perceived brew strength positively correlates to batch-size, or in other words, the larger the batch, the stronger the resultant brew. As used herein, the term "batch-size" will refer to the initial coffee mass and/or initial water volume, not the volume of coffee liquor ultimately yielded.

Figure 1:
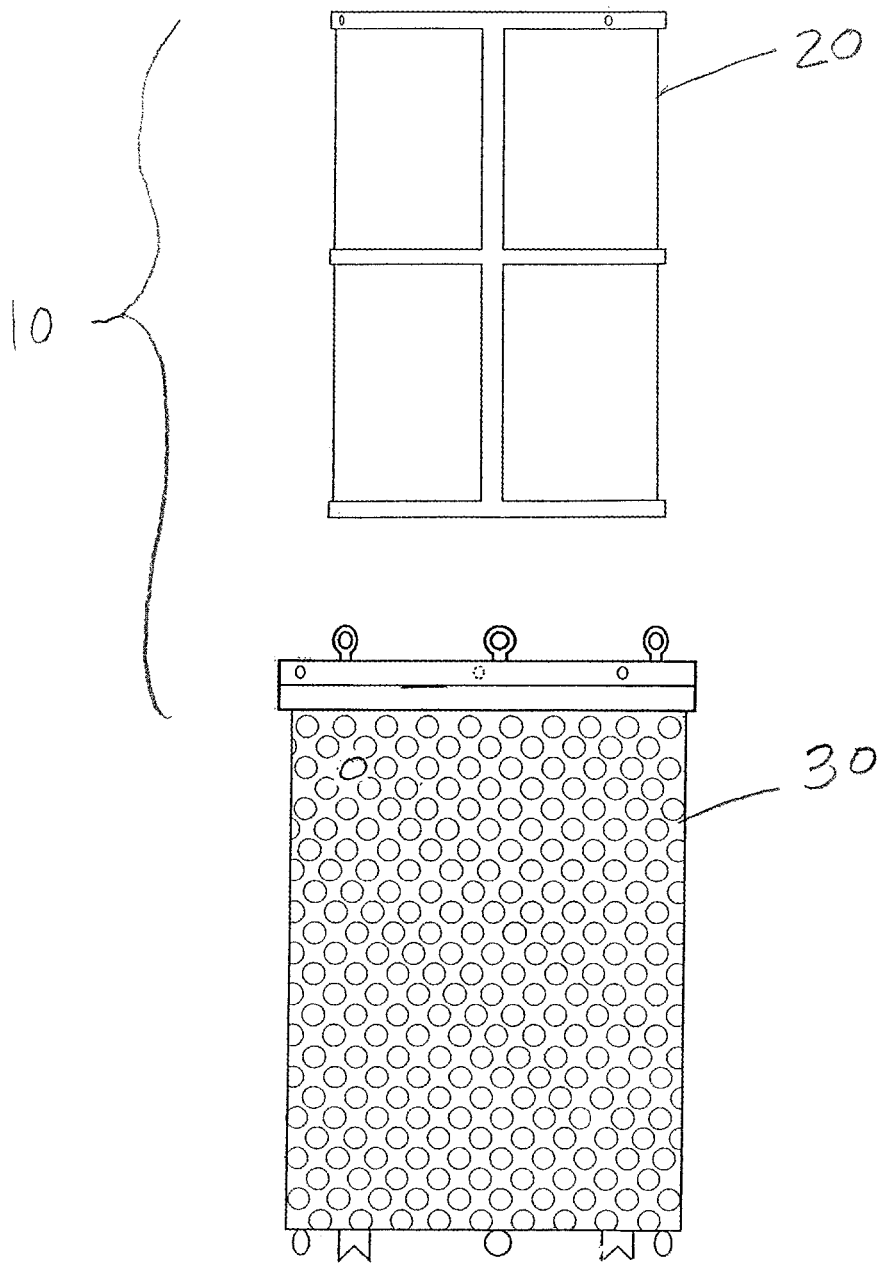
FIG. 1 is an exploded view of the filter assembly in accordance with the subject invention.
Figure 2:
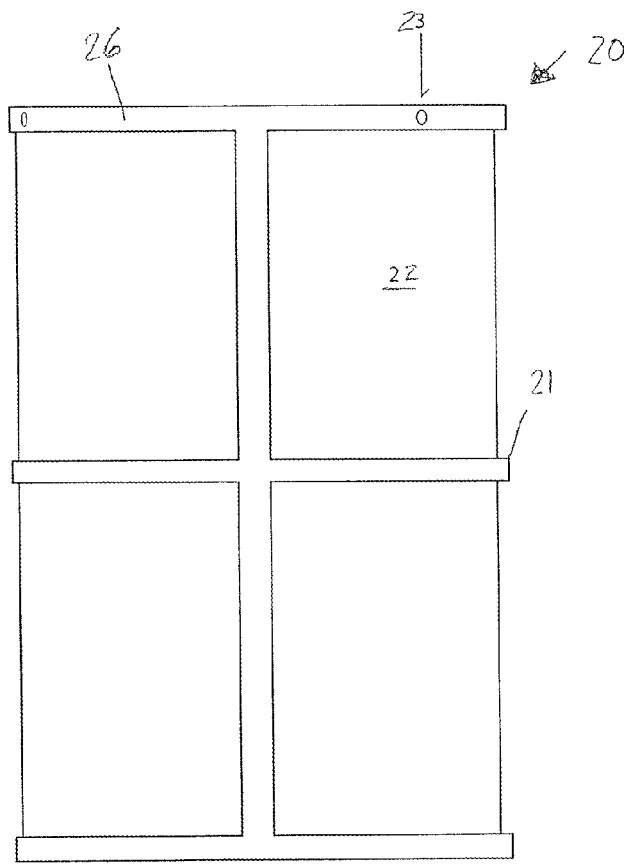
FIG. 2 is a side view of the filter insert shown in FIG. 1.

Thus, referring first to FIGS. 1-4, the filter assembly 10 of the present invention generally includes a filter insert 20 inserted and held within a filter frame 30. As shown in FIG. 2, the filter insert 20 includes a support frame 21 of welded construction for supporting a filter mesh 22. The support frame 21 may be made from a number of ⅛ inch thick by 1 inch wide stainless steel straps welded together in a cylindrical lattice arrangement bounded at opposite ends by a top and bottom end ring. In one aspect, the filter insert has a height of about 29.5 inches and a diameter of about 22.25 inches.

The mesh filter 22 is preferably made from a 40 micron stainless steel mesh sheet formed into a tube with a flat bottom 22*a* perpendicular to the side wall of the tube. The bottom 22*a* is attached to the side wall at suitable locations, preferably by welding. Furthermore, the mesh 22 is attached to the support frame 21 at suitable locations, preferably by welding. As will be discussed in further detail below, the mesh 22 holds the coffee grinds and filters out particles and sediments from the coffee.

Figure 3:
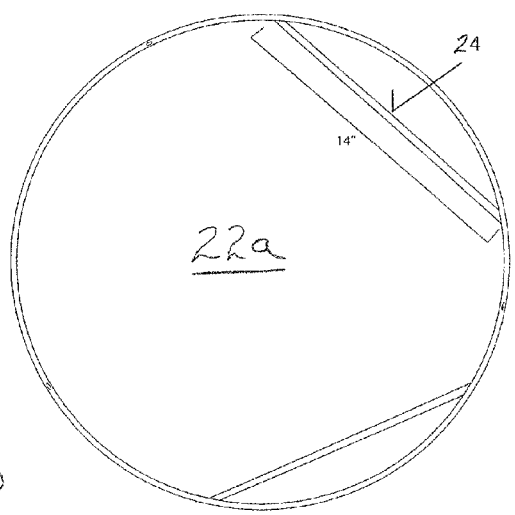
FIG. 3 is a top view of the filter insert.
Figure 5:
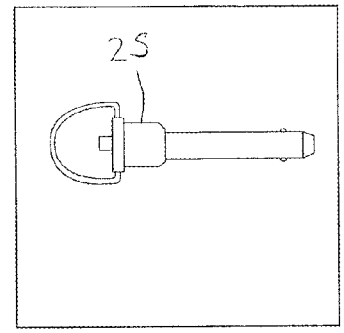
FIG. 5 is a detailed view of the pin connecting the filter insert to the filter frame.

Attachment points 23 in the form of drilled holes are preferably provided in a top ring 26 of the support frame 21 for attaching the filter insert 20 to the filter frame 30, as will be discussed in further detail below. Quick disconnect ball-lock pins 25, as shown in FIG. 5, can be inserted through the attachment points 23 to attach the filter insert 20 to the filter frame 30. The attachment points 23 are preferably offset around the circumference of the top ring 26 by 120 degrees. The top ring 26 is also preferably provided with at least one grip bar 24 welded between two locations along the inside periphery of the ring, as shown in FIG. 3, to facilitate gripping of the insert to remove the insert 20 from the frame 30. The grip bars 24 are preferably ¼ thick stainless steel bars having a length of about 14 inches that are welded into an inside surface of the top ring 26.

Figure 4:
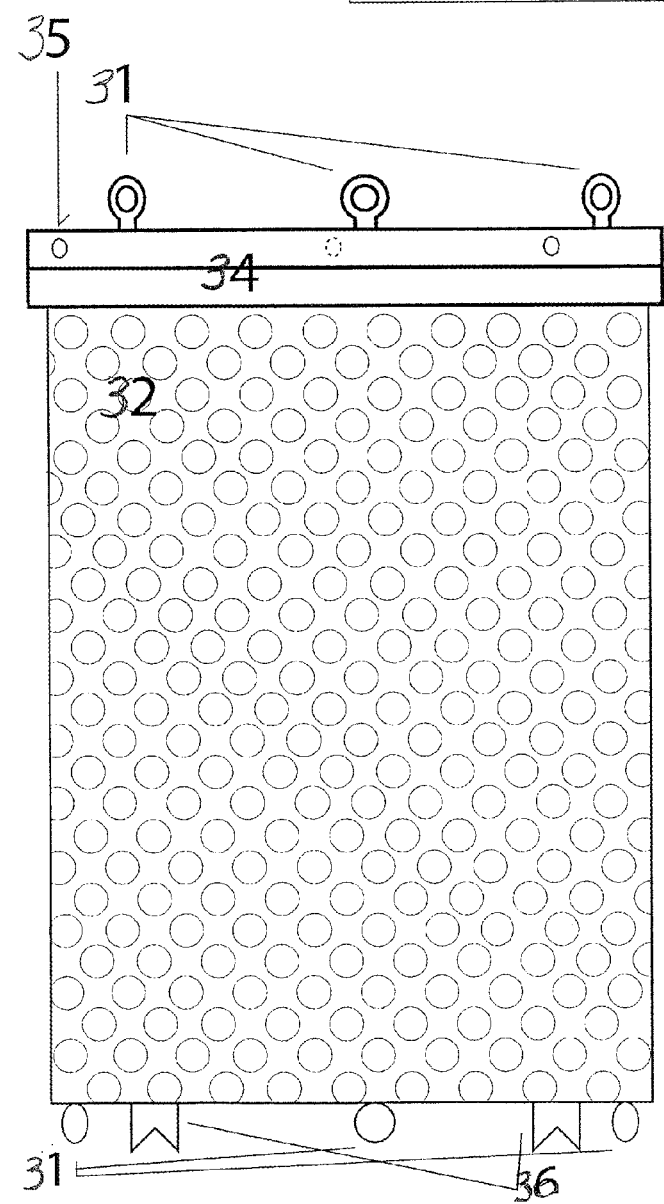
FIG. 4 is a side view of the filter frame shown in FIG. 1.

Referring now to FIG. 4, the filter frame 30 is constructed from a perforated tubular body 32 having a bottom and a cylindrical side wall defining an open top. The bottom and the cylindrical side wall of the body 32 may be made from stainless steel sheets having a thickness of about 1/16 inch and welded together to form a tube having a bottom and an open top end. The body 32 is formed with numerous ½ inch diameter holes punched through the sheets. The holes are densely spaced in both the side and the bottom of the body to allow liquid to pass through relatively freely.

Welded around the top open end of the tubular body 32 is a base ring 34 preferably made from two bands of ⅛ inch thick by 1 inch wide stainless steel to prevent warping of the body during hoisting. The base ring 34 provides rigidity to the body 32 and further provides a structure for securing three eyelets 31 for lifting the filter frame 30. At least one eyelet 31 is also preferably provided on the bottom of the body 32 to facilitate dumping of the filter assembly 10, as will be discussed in further detail below.

The eyelets 31 are preferably conventional off-the-shelf stainless steel hardware pieces that can be welded to or threaded into holes provided in the frame 30. The top eyelets 31 are preferably radially arranged around the top of the body at 120 degree intervals. The bottom eyelets 31 are also preferably radially arranged around the bottom of the body at 120 degree intervals, but are offset from the top eyelets by about 60 degrees. The eyelets 31 preferably extend above the top of the base ring by about 1.5 inches.

As mentioned above, the filter frame 30 is also provided with attachment points 35 arranged around the periphery of the base ring 34 for attaching the filter insert 20 to the filter frame 30. The attachment points 35 are holes drilled in the base ring 34 that are sized and arranged to match the holes 23 formed in the filter insert 20. Again, a number of pins 25, as shown in FIG. 5, can be used to releasably attach the filter insert 20 to the filter frame 30. The pins may be conventional push-button type quick-disconnect pins having a length of about 2.25 inches. The attachment holes 35 are preferably radially arranged around the base ring 34 at 120 degree intervals Two bars 36 are also preferably welded to the bottom of the body 32 for supporting the filter assembly, as will be described in further detail below. The bars 36 may be in the form of angle or L-shaped brackets and are attached to the bottom of the body 32 so as to define parallel grooves or channels facing away from the body. These channels are supported on bars when draining the filter assembly, as will be described below.

Thus assembled, the filter frame 30 preferably has an overall height of about 31 inches from the top of the eyelets to the bottom of the bars 36. The inner diameter of the filter frame 30 is about 20.5 inches leaving a space of about ¼ inch between the outer diameter surface of the filter insert 20 and the inner diameter surface of the frame. The space between the bottom of the filter insert and the interior of the bottom of the frame is also approximately ¼ inch.

Figure 6:
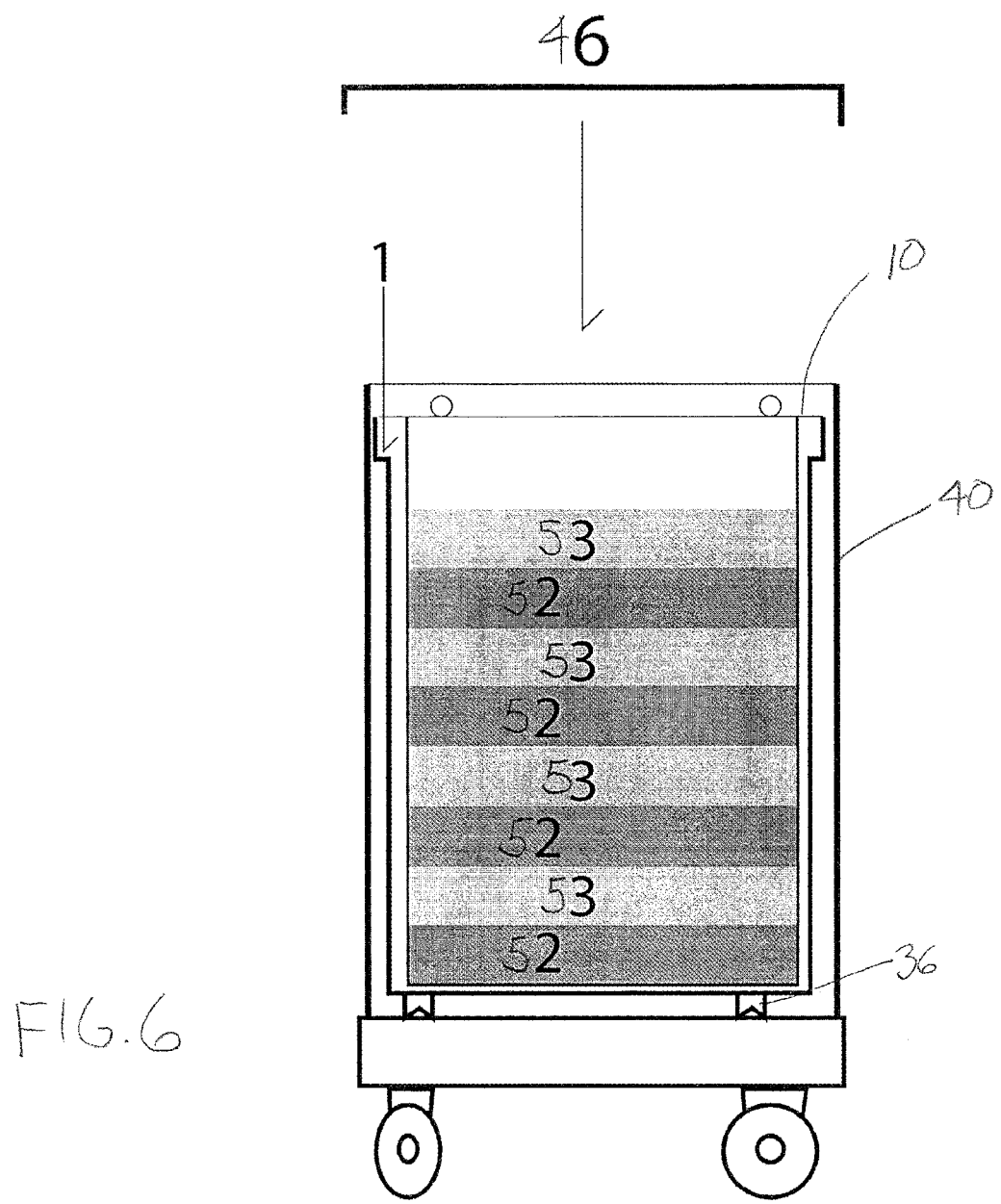
FIG. 6 is a cross-sectional view of the filter assembly of the present invention inserted into a brewing barrel.

FIG. 6 shows the filter assembly 10 of the present invention inserted within a barrel 40 having a lid 46. The barrel 40 has an inner diameter sufficient to allow a space of between 2-4 inches between the outer surface of the filter frame 30 and the inner surface of the barrel. Furthermore, the legs 36 attached to the bottom of the frame provide a 1 inch space between the bottom of the frame 30 and the bottom of the barrel. Based on the preferred dimensions of the filter insert and frame described above, these space dimensions can be achieved with a standard 55 gallon commercially available drum.

FIG. 6 further shows the step by step brewing process according to the present invention. As can be seen in FIG. 6, the filter assembly 10 is supported on the bottom of the barrel 40 by the pair of bars 36.

During a preferred "loading and brewing" step of the process, as shown in FIG. 6, the filter insert is inserted into the frame and held in place with the pins. The thus assembled filter assembly is then placed inside the barrel. 5-15 pounds of coffee grinds 52 are deposited inside the filter assembly and 5-15 gallons of water 53 are added. Preferably, a one-to-one ratio is utilized. A stirrup paddle may be used to push the coffee/water mixture to the bottom of the filter assembly without over agitating the mixture or causing the grinds to escape the filter. This procedure is repeated until 52 pounds of coffee and 40 gallons of water are used. At this point, the barrel is labeled and sealed with the lid to allow brewing for about 16 hours at room temperature.

Figure 7:
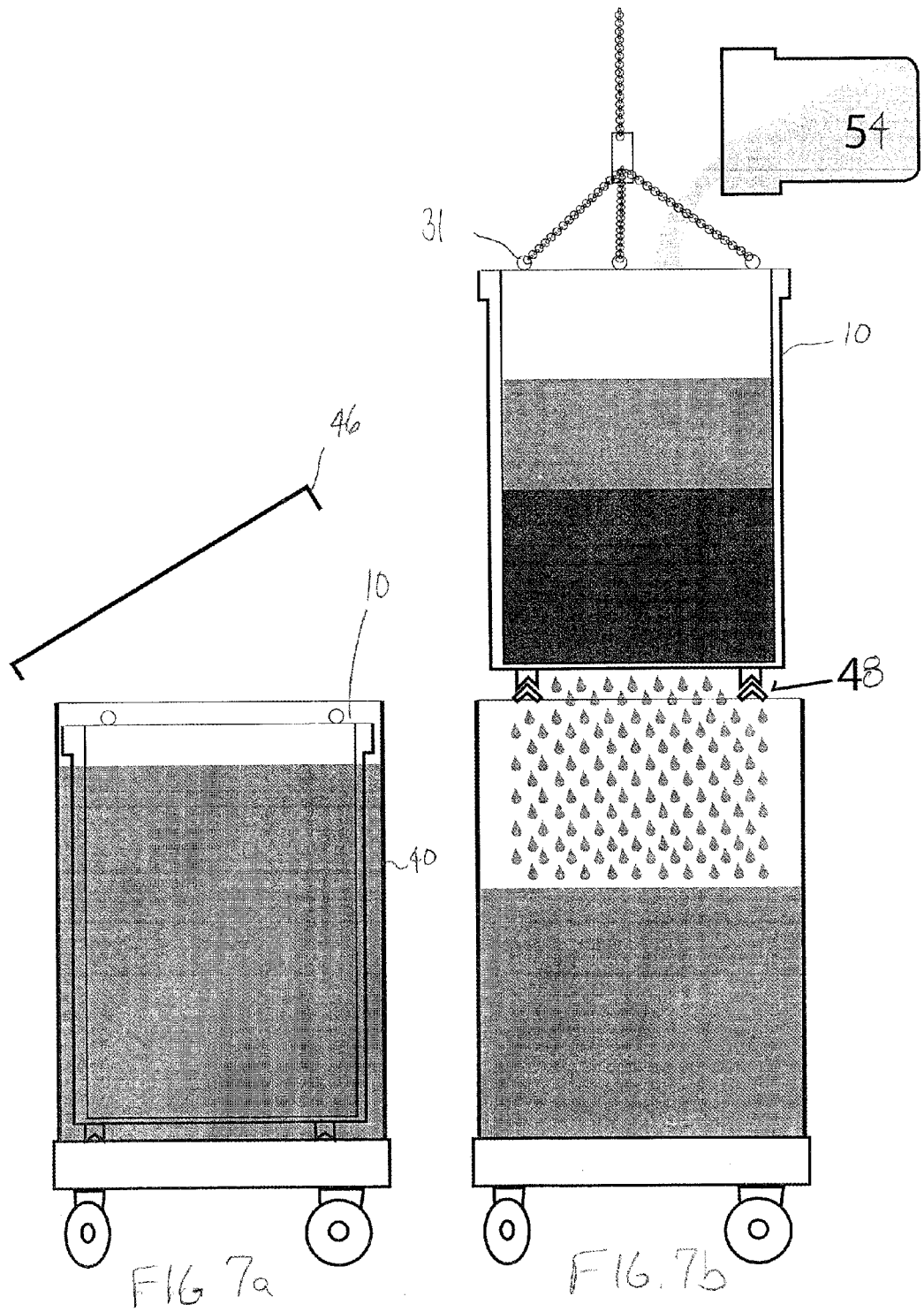
FIGS. 7*a* and 7*b* show the sequential steps of "tapping" using the apparatus of the present invention.

FIGS. 7a and 7b show the "tapping" step of the brewing process of the present invention. As shown, after the coffee has brewed for about 16 hours, the lid 46 is removed and the filter assembly 10 is lifted from the barrel 40 and temporarily supported on a pair of legs 48 set across the top of the barrel. The legs 48 may be L-stock or angle brackets having the strength and rigidity to support the assembly on top of the barrel.

A hoist having hooks to engage the eyelets 31 of the frame 30 is used to lift the filter assembly 10 from the barrel 40 and then to subsequently lower the assembly on the legs 48. In a preferred process, 5 gallons of water 54 are added to the inside of the filter assembly 10 and the filter assembly is allowed to drip for about 2-3 hours. At that point, the filter assembly 10 is removed from the top of the barrel, and the barrel is resealed and refrigerated until kegging. Sealing of the lid to the drum can be facilitated by a spring-loaded metal rim attachment (not shown).

The resulting coffee brew can be pumped from the barrel using a conventional liquid pump. The coffee within the barrel is first preferably stirred with a paddle before pumping. The pump's output line is preferably fed to a strainer or chinois positioned back over the barrel to remove any floating grinds from the coffee brew. Pumping and straining preferably takes place for about 2-3 minutes.

After straining, the coffee brew is pumped from the barrel to five gallon individual aluminum kegs. Again, a chinois placed over the opening of the kegs can be utilized for additional straining. The filled kegs are then pressurized with compressed nitrogen gas provided from a compressed nitrogen tank. The pressurized kegs are then refrigerated at 35-40 degrees Fahrenheit during storage.

Figure 8:
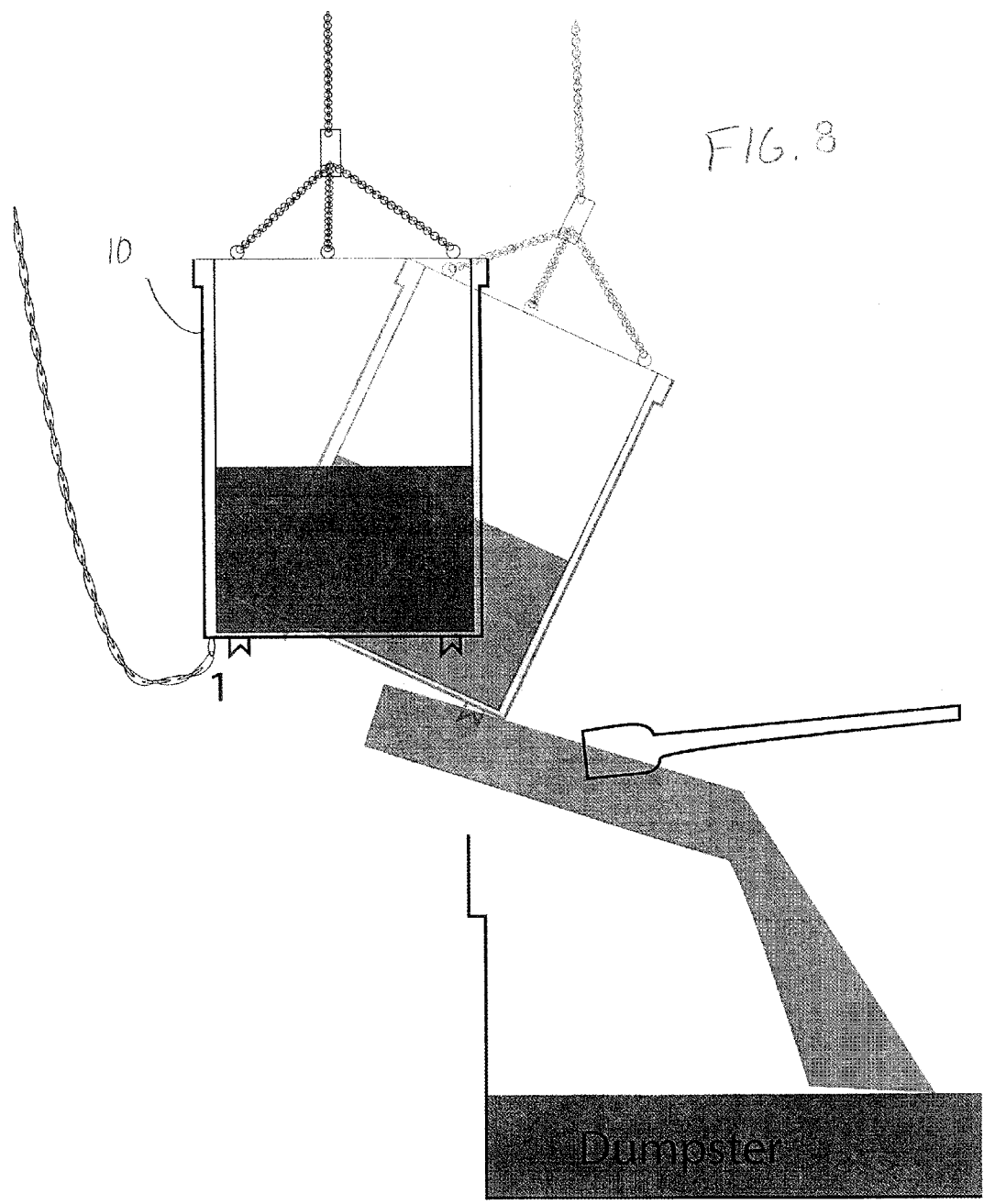
FIG. 8 shows the process for dumping the coffee grinds from the filter assembly of the present invention.

FIGS. 8 and 9 show the respective "dumping" and "cleaning" steps according to aspects of the present invention. In both steps, it can be seen how the one or more eyelets 31 provided on the bottom of the filter frame 30 are used to invert the filter assembly to both dump the coffee grinds and to allow access to the interior of the assembly 10 for cleaning. Specifically, a chain is attached to an eyelet on the bottom of the frame, while a hoist is used to suspend the barrel over a waste container or dumpster. The chain is pulled to raise the bottom of the frame, while the top hoist is lowered. As a result, the remaining contents of the filter assembly can be poured into the dumpster. A rubber or plastic stirrer can also be used to push any remaining grinds into the dumpster.

During cleaning, the filter assembly 10 may be inverted and held by a chain attached to one of the eyelets at the bottom of the frame. Conventional power-washing equipment can be utilized to remove any remaining grinds from the interior of the filter insert and/or the filter frame. The three pins holding the filter insert to the frame are then removed to separate the frame from the insert. The insert and the frame can then be rinsed, scrubbed and sanitized separately and allowed to dry, as shown in FIG. 9.

While various embodiments of the present invention are specifically illustrated and/or described herein, it will be appreciated that modifications and variations of the present invention may be effected by those skilled in the art without departing from the spirit and intended scope of the invention.

The invention claimed is:

1. An apparatus for cold brewing coffee comprising:
   a filter insert provided as a first component part of a filter assembly, said filter insert having a stainless steel mesh cylindrical side wall extending from a bottom end to a top end of said filter insert, a stainless steel mesh flat bottom perpendicular to and extending continuously across from opposing sides of said mesh cylindrical side wall and a support frame provided in a lattice arrangement along an outer surface periphery of said filter insert for supporting said mesh cylindrical side wall and said mesh flat bottom, wherein said mesh cylindrical side wall and said mesh flat bottom form a first enclosed tubular chamber adapted to receive a measured ratio of a coffee grind and water mixture, and wherein said stainless steel mesh is a woven mesh construction with openings on the order of microns to facilitate a controlled release of contents brewed within said first enclosed tubular chamber;
   a filter frame provided as a second component part of said filter assembly, said filter frame forming a second enclosed tubular chamber adapted to releasably receive said first enclosed tubular chamber of said filter insert therein, said filter frame having a perforated cylindrical side wall that is spaced radially outward from said mesh cylindrical side wall of said filter insert, a perforated flat bottom perpendicular to and extending continuously across from opposing sides of said perforated cylindrical side wall that is spaced axially outward from said mesh flat bottom of said filter insert and two support bars attached to said perforated flat bottom, wherein a first space is defined between an inner diameter of said filter frame and an outer diameter of said filter insert when said first enclosed tubular chamber of said filter insert is received and arranged coaxially within said second enclosed tubular chamber of said filter frame; and a barrel having an open top end and closed bottom end, said top end of said barrel receiving said filter assembly comprising said coaxial arrangement of said filter insert and said filter frame, and said bottom end of said barrel adapted to support said support bars attached to said flat bottom of said filter frame, wherein a second space is defined between an outer diameter of said filter frame and an inner diameter of said barrel.

2. The apparatus of claim 1, further comprising a top ring disposed at said top end of said filter insert, said top ring having a plurality of radially arranged attachment points for attaching said filter insert coaxially received within said filter frame.

3. The apparatus of claim 2, further comprising a base ring disposed at a top end of said filter frame, said base ring having a plurality of attachment points sized and arranged to match said attachment points arranged along said top ring of said filter insert.

4. The apparatus of claim 3, wherein said attachment points of both said top ring and said base ring comprise drilled holes and said apparatus further comprises quick disconnect ball-lock pins inserted into said holes for attaching said filter insert to said filter frame.

5. The apparatus of claim 3, further comprising a plurality of eyelets attached to said base ring of said filter frame to facilitate lifting of said filter frame.

6. The apparatus of claim 2, further comprising a grip bar secured between two attachment points provided along an inside periphery of said top ring of said filter insert to facilitate gripping of said filter insert.

7. The apparatus of claim 1, further comprising an eyelet attached to said perforated flat bottom of said filter frame to facilitate inverting of said filter frame.

8. The apparatus of claim 1, further comprising support legs arranged across said open top end of said barrel for engaging said support bars of said filter frame to facilitate temporary support of said filter assembly positioned above said open top end of said barrel.

9. The apparatus of claim 8, wherein said support legs arranged across said open top end of said barrel comprise angle brackets, and wherein said support bars of said filter frame comprise angle brackets defining channels facing away from said perforated flat bottom of said filter frame for receiving said angle brackets of said support legs.

10. The apparatus of claim 1, wherein said space defined between said inner diameter of said filter frame and said outer diameter of said filter insert is between ⅛ inch and ½ inch.

11. The apparatus of claim 1, wherein said space defined between said inner diameter of said barrel and said outer diameter of said filter frame is between 2-4 inches, and wherein a space of about 1 inch is defined between said bottom of said filter frame and said bottom of said barrel.

\* \* \* \* \*